United States Patent
Dashtipour et al.

(10) Patent No.: US 10,127,127 B2
(45) Date of Patent: Nov. 13, 2018

(54) SYSTEMS AND METHODS FOR PRE-WARNING A MONITORING TOOL FOR A COMMUNICATION BUS

(71) Applicant: QUALCOMM Incorporated, San Diego, CA (US)

(72) Inventors: Behnam Dashtipour, San Diego, CA (US); James Calvin Hudson, IV, National City, CA (US)

(73) Assignee: QUALCOMM Incorporated, San Diego, CA (US)

(*) Notice: Subject to any disclaimer, the term of this patent is extended or adjusted under 35 U.S.C. 154(b) by 91 days.

(21) Appl. No.: 15/171,353

(22) Filed: Jun. 2, 2016

(65) Prior Publication Data
US 2016/0357653 A1    Dec. 8, 2016

Related U.S. Application Data

(60) Provisional application No. 62/171,125, filed on Jun. 4, 2015.

(51) Int. Cl.
| | |
|---|---|
| G06F 11/30 | (2006.01) |
| G06F 13/40 | (2006.01) |
| G06F 13/16 | (2006.01) |
| G06F 11/22 | (2006.01) |
| G06F 11/273 | (2006.01) |
| G06F 11/34 | (2006.01) |

(52) U.S. Cl.
CPC ...... *G06F 11/3027* (2013.01); *G06F 11/2221* (2013.01); *G06F 11/273* (2013.01); *G06F 11/349* (2013.01); *G06F 13/1605* (2013.01); *G06F 13/1668* (2013.01); *G06F 13/4068* (2013.01)

(58) Field of Classification Search
USPC .......................................................... 714/43
See application file for complete search history.

(56) References Cited

U.S. PATENT DOCUMENTS

| | | | |
|---|---|---|---|
| 6,748,558 B1 * | 6/2004 | Gonzales | ............ G06F 11/3409 702/182 |
| 7,624,225 B2 | 11/2009 | Gower et al. | |
| 8,060,774 B2 | 11/2011 | Smith et al. | |
| 8,760,945 B2 | 6/2014 | Jeon | |

(Continued)

*Primary Examiner* — Kamini B Patel

(74) *Attorney, Agent, or Firm* — Withrow & Terranova, PLLC

(57) ABSTRACT

Systems and methods for pre-warning a monitoring tool for a communication bus are disclosed. In exemplary aspects, a monitoring tool is coupled to a communication bus. The monitoring tool initially monitors the communication bus in a first manner. When a host changes a parameter of signals on the communication bus, the host sends a signal change command. The monitoring device receives the signal change command and changes the manner that the monitoring device uses to monitor the communication bus or the manner that the monitoring device uses to check protocol. By providing the signal change command before the parameter on the communication bus changes, the monitoring device may use a new manner of monitoring the communication bus in a timely fashion such that the monitoring device does not provide erroneous information about the state of the communication bus.

17 Claims, 9 Drawing Sheets

(56) References Cited

U.S. PATENT DOCUMENTS

| | | | | |
|---|---|---|---|---|
| 2002/0194291 A1* | 12/2002 | Najam | ............... | H04L 49/103 |
| | | | | 709/213 |
| 2003/0088796 A1* | 5/2003 | Abdulkarim | ......... | G06F 1/3203 |
| | | | | 713/300 |
| 2004/0078714 A1* | 4/2004 | Hentsch | ............... | B60R 25/00 |
| | | | | 714/43 |
| 2007/0064509 A1* | 3/2007 | Schafer | ............ | G11C 7/1027 |
| | | | | 365/201 |
| 2007/0094528 A1* | 4/2007 | Fredriksson | ...... | H04L 12/40026 |
| | | | | 713/375 |
| 2008/0288804 A1 | 11/2008 | Gorti et al. | | |
| 2011/0202700 A1* | 8/2011 | Inoue | ............... | G06F 13/385 |
| | | | | 710/305 |
| 2015/0186234 A1* | 7/2015 | Hofman | ............ | G06F 11/221 |
| | | | | 714/43 |
| 2015/0286593 A1* | 10/2015 | Gans | ............... | G11C 7/1045 |
| | | | | 710/313 |

\* cited by examiner

Mode Register Assignment in LPDDR4 SDRAM

| MR# | OP[7] | OP[6] | OP[5] | OP[4] | OP[3] | OP[2] | OP[1] | OP[0] |
|---|---|---|---|---|---|---|---|---|
| 0 | CATR | RFU | RFU | RZQI | | RFU | RFU | Refresh mode |
| 1 | RPST | nWR (for AP) | | | RD-PRE | WR-PRE | BL | |
| 23 | DQS interval timer run time setting | | | | | | | |
| 24 | TRR Mode | TRR Mode BAn | | | | Unlimited MAC | MAC Value | |
| 25 | PPR Resource | | | | | | | |
| 26 | RFU | | | | | | | |
| 27 | RFU | | | | | | | |
| 28 | RFU | | | | | | | |
| 29 | RFU | | | | | | | |
| 30 | RFU | | | | | | | |
| 31 | RFU | | | | | | | |
| 32 | DQ Calibration Pattern "A" (default = 5AH) | | | | | | | |
| 33 | RFU | | | | | | | |
| 34 | RFU | | | | | | | |
| 35 | RFU | | | | | | | |
| 36 | RFU | | | | | | | |
| 37 | RFU | | | | | | | |
| 38 | RFU | | | | | | | |
| 39 | RFU | | | | | | | |
| 40 | DQ Calibration Pattern "B" (default = 3CH) | | | | | | | |

FIG. 4

| SDRAM Command | SDR Command Pins CS | SDR CA Pins (6) CA0 | CA1 | CA2 | CA3 | CA4 | CA5 | CK_t edge | Notes |
|---|---|---|---|---|---|---|---|---|---|
| Deselect (DES) | H | | | X | | | | R1 | 1,2 |
| Multi Purpose Command (MPC) | L | OP0 | OP1 | OP2 | OP3 | OP4 | OP6 | R1 | 1,2,9 |
| | | | | | | | OP5 | R2 | |
| Write -1 (WR-1) | H | L | L | H | L | L | BL | R1 | 1,2,3,6,7,9 |
| | L | BA0 | BA1 | BA2 | V | C9 | AP | R2 | |
| Self Refresh Exit (SRX) | H | L | L | H | L | H | V | R1 | 1,2 |
| | L | | | V | | | | R2 | |
| Mask Write -1 (MWR-1) | H | L | L | H | H | L | L | R1 | 1,2,3,6,7,9 |
| | L | BA0 | BA1 | BA2 | V | C9 | AP | R2 | |
| RFU | H | L | L | H | H | H | V | R1 | 1,2 |
| | L | | | V | | | | R2 | |
| Read -1 (RD-1) | H | L | H | L | L | L | BL | R1 | 1,2,3,6,7,9 |
| | L | BA0 | BA1 | BA2 | V | C9 | AP | R2 | |
| CAS-2 (Write-2, Mask Write-2, Read-2, MRR-2, MPC) | H | C2 | C3 | C4 | C5 | C6 | C8 | R1 | 1,8,9 |
| | L | | | | | | C7 | R2 | |
| RFU | H | L | H | L | H | L | V | R1 | 1,2 |
| | L | | | V | | | | R2 | |
| RFU | H | L | H | H | H | H | V | R1 | 1,2 |
| | L | | | V | | | | R2 | |
| Mode Register Write-1 (MRW-1) | H | L | H | H | L | L | OP7 | R1 | 1,2,11 |
| | L | MA0 | MA1 | MA2 | MA3 | MA4 | MA5 | R2 | |

FIG. 5

SYSTEMS AND METHODS FOR PRE-WARNING A MONITORING TOOL FOR A COMMUNICATION BUS

PRIORITY APPLICATION

The present application claims priority to and the benefit of U.S. Provisional Patent Application Ser. No. 62/171,125, filed on Jun. 4, 2015, and entitled "PRE-WARNING A MONITORING TOOL FOR A COMMUNICATION BUS," which is incorporated herein by reference in its entirety.

BACKGROUND

I. Field of the Disclosure

The technology of the disclosure relates generally to debugging and testing communication buses.

II. Background

Computing devices have become increasingly common in modern society. As computing devices have evolved, users have come to expect that the computing devices will be increasingly fast. In most instances, later computing devices have, in fact, been faster. Almost every computing device relies on memory to store operating instructions, software, data, and the like. Thus, as the computing devices have exhibited increased speed, access to memory elements has also increased in volume and speed.

An exemplary memory element is a dynamic random access memory (DRAM) that may employ a double data rate (DDR) and may be accessed by a communication bus that employs clock speeds over one gigahertz. Additionally, different protocols contemplate that the frequency on the communication bus may change. For example, the standard for DRAM published by the Joint Electron Device Engineering Council (JEDEC) contemplates many distinct frequencies that may be used for various purposes. Further, changes in frequency may be coupled with changes in termination impedances. Still further, signal levels may change as different terminations are used. Such changes may be made to achieve desired performance or power optimization.

While the use of simulation tools has allowed designers to simulate circuit performance with increasing accuracy, almost every computing device still undergoes testing, debugging, and protocol compliance checking. Such testing and debugging relies on a testing device that is coupled to the computing device under test and samples signals. Such testing devices may generate erroneous data if the testing device is not reconfigured in response to changes in the frequency of the signal being sampled. When the frequency of the signal being sampled changes without notice to the testing device, such erroneous data is generated. Accordingly, improved testing techniques are required to allow for testing in such dynamic environments.

SUMMARY OF THE DISCLOSURE

Aspects disclosed in the detailed description include systems and methods for pre-warning a monitoring tool of a communication bus. In exemplary aspects, a monitoring tool is coupled to a communication bus. The monitoring tool initially monitors the communication bus in a first manner. When a host changes a parameter of signals on the communication bus, the host sends a signal change command. The monitoring device receives the signal change command and changes the manner that the monitoring device uses to monitor the communication bus or the manner that the monitoring device uses to check protocol. By providing the signal change command before the parameter on the communication bus changes, the monitoring device may use a new manner of monitoring the communication bus in a timely fashion such that the monitoring device does not provide erroneous information about the state of the communication bus. In non-limiting examples, sampling rate, protocol parameters, and/or reference voltage may be adjusted so that samples taken by the monitoring device are accurate representations of the signals being sampled.

In this regard in one aspect, a device for monitoring a communication bus is provided. The device includes an interface configured to couple to a communication bus. The device also includes a control system operatively associated with the interface. The control system is configured to sample signals on the communication bus in a first manner. The control system is also configured to detect a signal change command. The control system is also configured, in response to the signal change command, to sample the signals on the communication bus in a second manner.

In another aspect, a method for monitoring a communication bus is provided. The method includes coupling a monitoring device to a communication bus. The method also includes sampling signals on the communication bus in a first manner. The method also includes detecting a signal change command. The method also includes, in response to detecting the signal change command, sampling the signals on the communication bus in a second manner.

In another aspect, a method for monitoring a communication bus is provided. The method includes coupling a monitoring device to a memory bus. The method also includes sampling signals on the memory bus. The method also includes detecting a mode register command addressed to the monitoring device on the memory bus.

BRIEF DESCRIPTION OF THE FIGURES

FIG. 4 is a table of mode register (MR) commands illustrating reserved commands that may be used by exemplary aspects of the present disclosure;

FIG. 5 is a JEDEC Command Truth Table illustrating reserved commands that may be used by exemplary aspects of the present disclosure;

DETAILED DESCRIPTION

Figure 1:
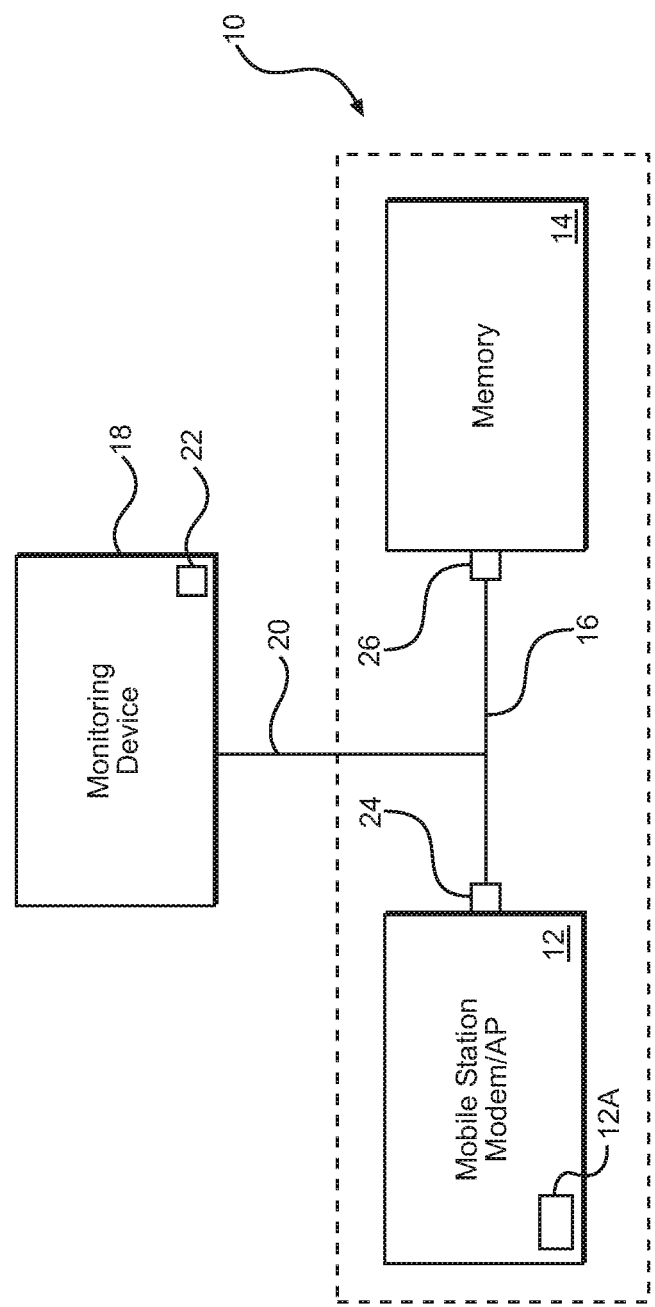
FIG. 1 is a block diagram of an exemplary communication bus between elements with a monitoring device coupled to the communication bus.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include systems and methods for pre-warning a monitoring tool of a communication bus. In exemplary aspects, a monitoring tool is coupled to a communication bus. The monitoring tool initially monitors the communication bus in a first manner. When a host changes a parameter of signals on the communication bus, the host sends a signal change command. The monitoring device receives the signal change command and changes the manner that the monitoring device uses to monitor the communication bus or the manner that the monitoring device uses to check protocol. By providing the signal change command before the parameter on the communication bus changes, the monitoring device may use a new manner of monitoring the communication bus in a timely fashion such that the monitoring device does not provide erroneous information about the state of the communication bus. In non-limiting examples, sampling rate, protocol parameters, and/or reference voltage may be adjusted so that samples taken by the monitoring device are accurate representations of the signals being sampled.

In this regard, FIG. 1 is a block diagram of an exemplary communication bus between elements with a monitoring device coupled to the communication bus. In particular, FIG. 1 illustrates a communication system 10 including a host or an application processor (sometimes referred to as AP) 12, which may be a mobile station modem (sometimes referred to as MSM), having a control system 12A. The control system 12A may be a processing core or other hardware and instructions that enable the functionality of the present disclosure. The application processor 12 is communicatively coupled to a memory element 14 by a communication bus 16. The control system 12A further controls communication from the application processor 12 to the memory element 14. In an exemplary aspect, the memory element 14 is a dynamic random access memory (DRAM) memory element. To the extent that the communication bus 16 carries signals between the application processor 12 and the memory element 14, the communication bus 16 may sometimes be referred to as a memory bus. A monitoring device 18 is coupled to the communication bus 16 by a monitoring bus 20. The monitoring device 18 may include a control system 22, which may be a processor with associated software that enables exemplary aspects of the present disclosure.

As is understood, the communication bus 16 may include a first endpoint 24 configured to be coupled to the application processor 12 and a second endpoint 26 configured to be coupled to the memory element 14. Additionally, the communication bus 16 may include a communication medium configured to carry signals between the first endpoint 24 and the second endpoint 26. It should be appreciated that the application processor 12 may include a communication bus interface configured to be coupled to the first endpoint 24. The control system 12A is operatively coupled to the communication bus interface and controls the operation thereof. Likewise, the memory element 14 may include a communication bus interface configured to be coupled to the second endpoint 26.

Figure 2:
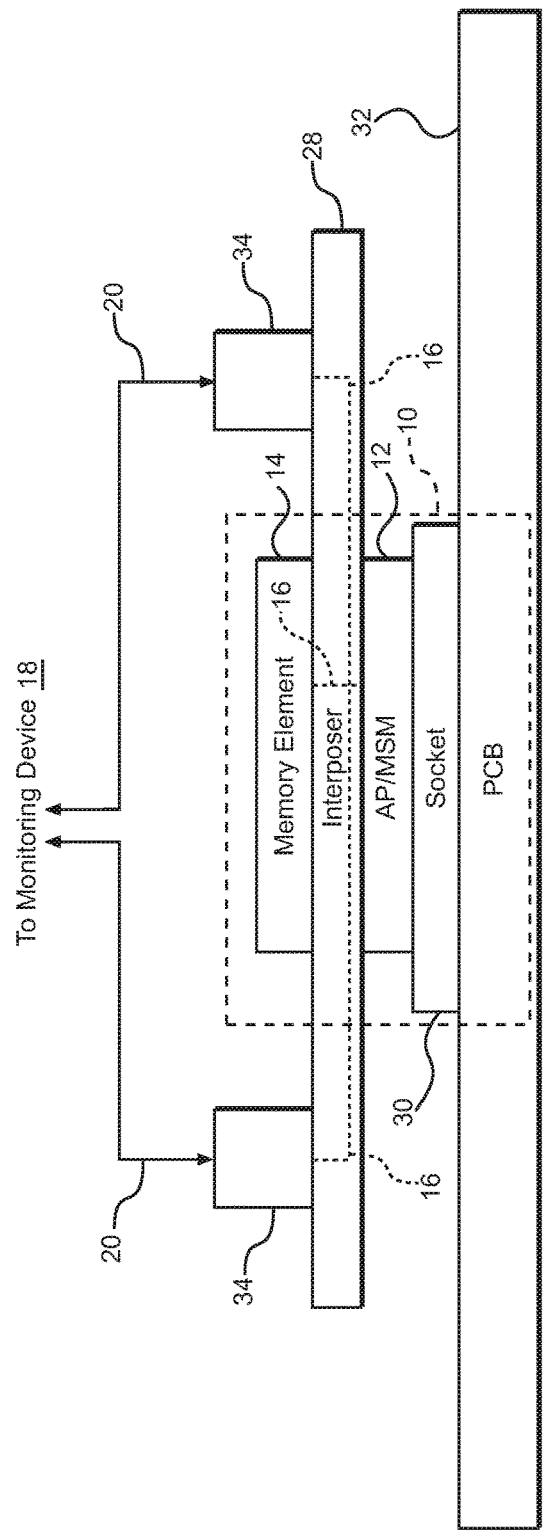
FIG. 2 is a simplified side elevational view of the communication bus of FIG. 1 between elements adapted to interface with the monitoring device.

To further assist in understanding the communication system 10, FIG. 2 is a simplified side elevational view of the communication system 10 of FIG. 1 with the communication bus 16 embedded in an interposer 28. Thus, in an exemplary aspect, the application processor 12 is mounted on a socket 30 to a printed circuit board (PCB) 32, and the memory element 14 is positioned over the application processor 12 with the interposer 28 therebetween. The communication bus 16 is coupled to the monitoring bus 20 through interface 34. In an exemplary aspect, the interface 34 may include two (2) sockets to which respective ribbon cables are attached. The ribbon cables (not illustrated) form the monitoring bus 20.

In an exemplary aspect of the present disclosure, the monitoring device 18 is a NEXUS MCA5000 sold by Tektronix of Beaverton, Oreg. modified to operate according to the methods disclosed herein, and the interface 34 is a pair of oppositely positioned sockets. In another exemplary aspect, the monitoring device 18 is a comparable device sold by Keysight of Santa Rosa, Calif., also modified to operate according to the methods disclosed herein, and the interface 34 is a pair of sockets positioned on two adjacent sides of the memory element 14. The conventional devices of Tektronix and Keysight are currently incapable of adjusting to dynamic parameter changes on the communication bus 16. That is, once a system configuration is set, the monitoring device 18 will continue to produce data according to that system configuration, even though a frequency on the communication bus 16 has changed such that a different system configuration is appropriate.

When the monitoring device 18 samples the data on the communication bus 16 at an incorrect frequency or assuming incorrect parameters or to test for a different protocol than is currently being used on the communication bus 16, the data presented to the monitoring device 18 is incorrect. As one example of how the data is incorrect, an exemplary eye diagram is muddled and incapable of providing valuable information. Further, an improper sample rate or system configuration may show numerous false positives and/or protocol violations. Such false positives are also not useful to the entity testing the communication bus 16.

Exemplary aspects of the present disclosure provide a solution to this improper sampling and allow the monitoring device 18 to function as intended. That is, false positives and/or protocol violations are reduced or eliminated, allowing the monitoring device 18 to provide accurate information to the entity testing the communication bus 16 such that debugging or testing can proceed without having to determine if a result is a false positive.

Figure 3:
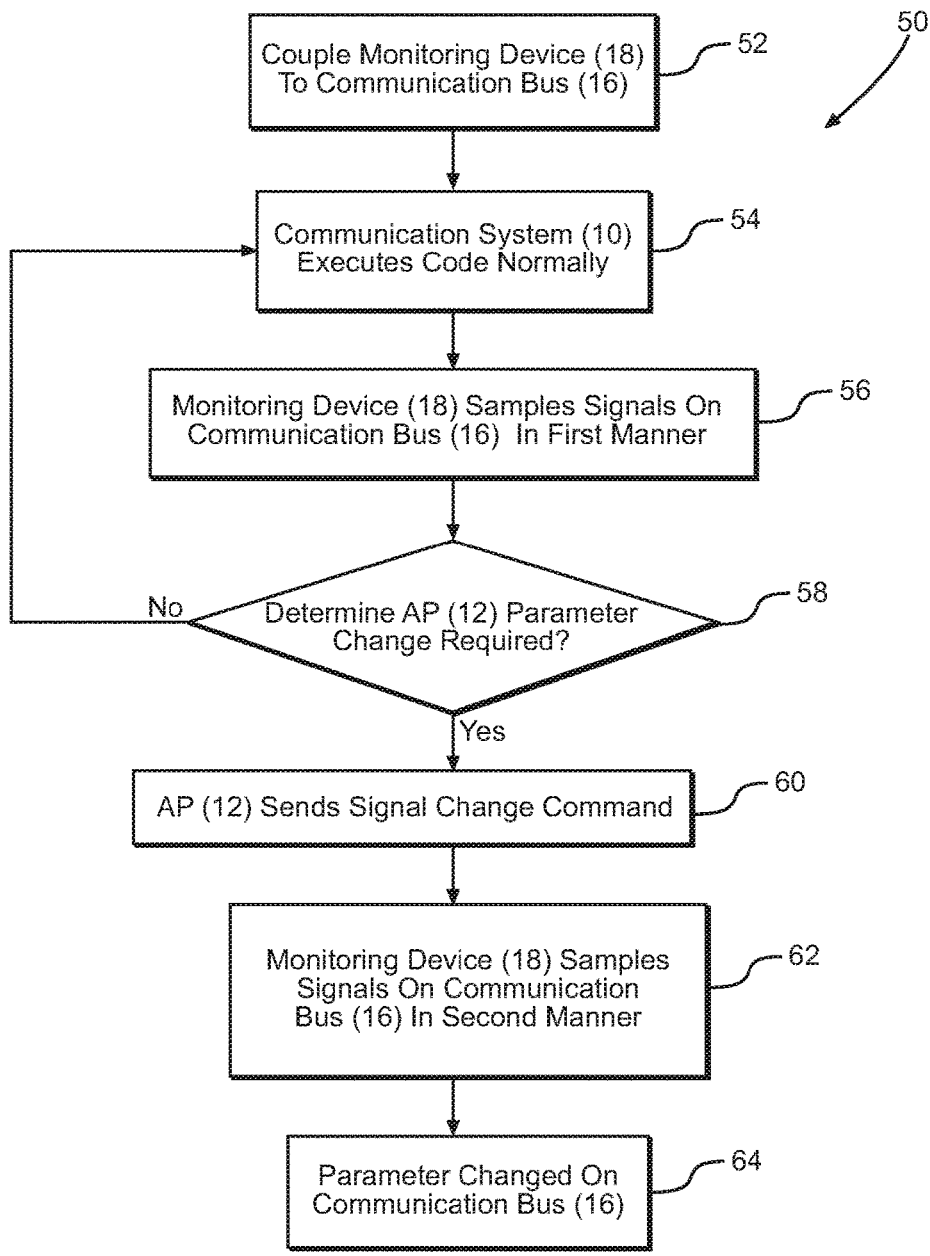
FIG. 3 is a flowchart illustrating an exemplary process for pre-warning the monitoring device for the communication bus.

In this regard, FIG. 3 is a flowchart illustrating an exemplary process 50 for pre-warning the monitoring device 18 for changes in parameters on the communication bus 16. The process 50 begins with coupling the monitoring device 18 to the communication bus 16 (block 52). The coupling may be done by attaching the ribbon cables to the interfaces 34 or any other well understood process. The communication system 10 executes code normally (block 54) and commands are sent to the memory element 14 over the communication bus 16. The monitoring device 18 samples signals on the communication bus 16 in a first manner (block 56). That is, the first manner includes a protocol check and sampling point (in voltage and time domain) appropriate for the frequency, termination impedance, and protocol parameters governing the communication bus 16 at the first sampling interval.

With continued reference to FIG. 3, the application processor 12, and in particular, the control system 12A, determines that a parameter change is required (block 58) by an impending parameter change command to the memory element 14. Such parameter change commands may be required to save power, increase performance, or the like. The parameter change may affect the frequency at which signals are sent and received on the communication bus 16, termination impedances at the endpoints 24 and 26, or protocol parameters valid for a given frequency. If the answer to block 58 is no, then the process 50 continues as noted with normal execution.

With continued reference to FIG. 3, if, however, the answer to block 58 is yes, the application processor 12 sends a signal change command (block 60). The signal change command may be effectuated through a number of different techniques. In a first exemplary aspect, the signal change command can be sent using a reserved mode register (MR) command. A list of exemplary reserved MR commands for low power double data rate (LPDDR) version 4 (LPDDR4) synchronous DRAM (SDRAM) can be found in Table 70 illustrated in FIG. 4. As is understood, the notation "RFU" stands for "Reserved for Future Use." Table 70 comes from Table 9 in JEDEC's LPDDR4 standard (JESD209-4). In a particularly contemplated aspect, the MR 30 72 or MR 39 74 is used. The use of an MR command still has to obey MR timing requirements, but otherwise should not disrupt traffic on the communication bus 16. In an exemplary aspect, the operand of the MR command may indicate a new frequency at which the communication bus 16 will operate and for which the monitoring device 18 should take frequency appropriate samples. In a second exemplary aspect, the signal change command can be sent using a JEDEC reserved command (e.g., RFU with a coding of CA[0:4]=LLHHH). A JEDEC Command Truth Table 80 showing reserved commands is illustrated in FIG. 5. Truth Table 80 corresponds to Table 63 in the JEDEC standard (JESD209-4). In a third exemplary aspect, the signal change command can be sent using a sequence of unrelated commands arranged in a particular fashion (e.g., issue two (2) back-to-back activate commands to the same row). In a fourth exemplary aspect, the signal change command can be sent through a side band channel or other out of band channel. This aspect is illustrated below with reference to FIG. 6.

Note that using an MR command may be more advantageous than other possible techniques because MR commands on the communication bus 16 are already detected, parsed, and shown by the monitoring device 18. The MR commands are relatively short, and thereby do not significantly increase latency or cause performance related concerns. There is no need to synchronize the MR commands with other activity because the MR commands are already embedded within transactions on the communication bus 16. There are likewise, plenty of reserved MR commands for use in this fashion. The use of the MR command in this fashion does require a modification to the JEDEC standard so that none of the vendors operating in this industry use the selected MR command for some proprietary purpose. Likewise, the memory element 14 on the communication bus 16 may be programmed to ignore the selected MR command.

With continued reference to FIG. 3, once the signal change command is sent, the monitoring device 18 changes its operation to sample the signals and check protocol on the communication bus 16 in a second manner (block 62) according to the parameter that is being changed. The parameter is changed on the communication bus 16 (block 64) and operation continues. Note that the parameter on the communication bus 16 is typically changed at a predefined synchronization point, so sending the signal change command any time prior to the synchronization point will allow the monitoring device 18 to adjust settings in a timely fashion. In an exemplary aspect, the synchronization point is a self-refresh exit.

Figure 6:
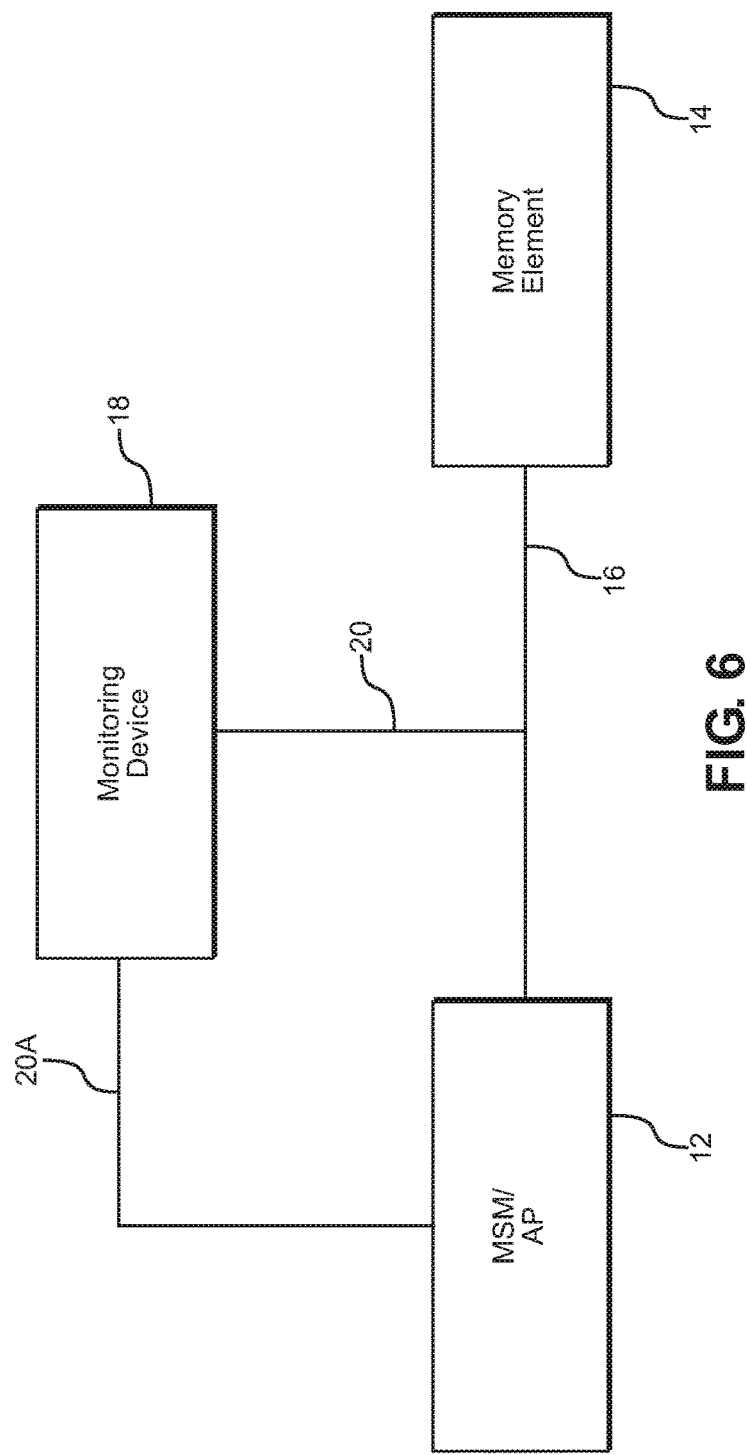
FIG. 6 is a simplified block diagram of an exemplary communication system in which the monitoring device that has a side band channel to provide a signal change command to the monitoring device.

FIG. 6 is a simplified block diagram of an exemplary monitoring device 18 that has a side band channel 20A to provide the signal change command to the monitoring device 18. Rather than send the signal change command over the communication bus 16, the signal change command can be sent over the side band channel 20A or another out of band channel. The application processor 12 may detect the upcoming signal change and prepare the signal change command to send over the side band channel 20A instead of embedding the signal change command in the communication stream over the communication bus 16.

Figure 7:
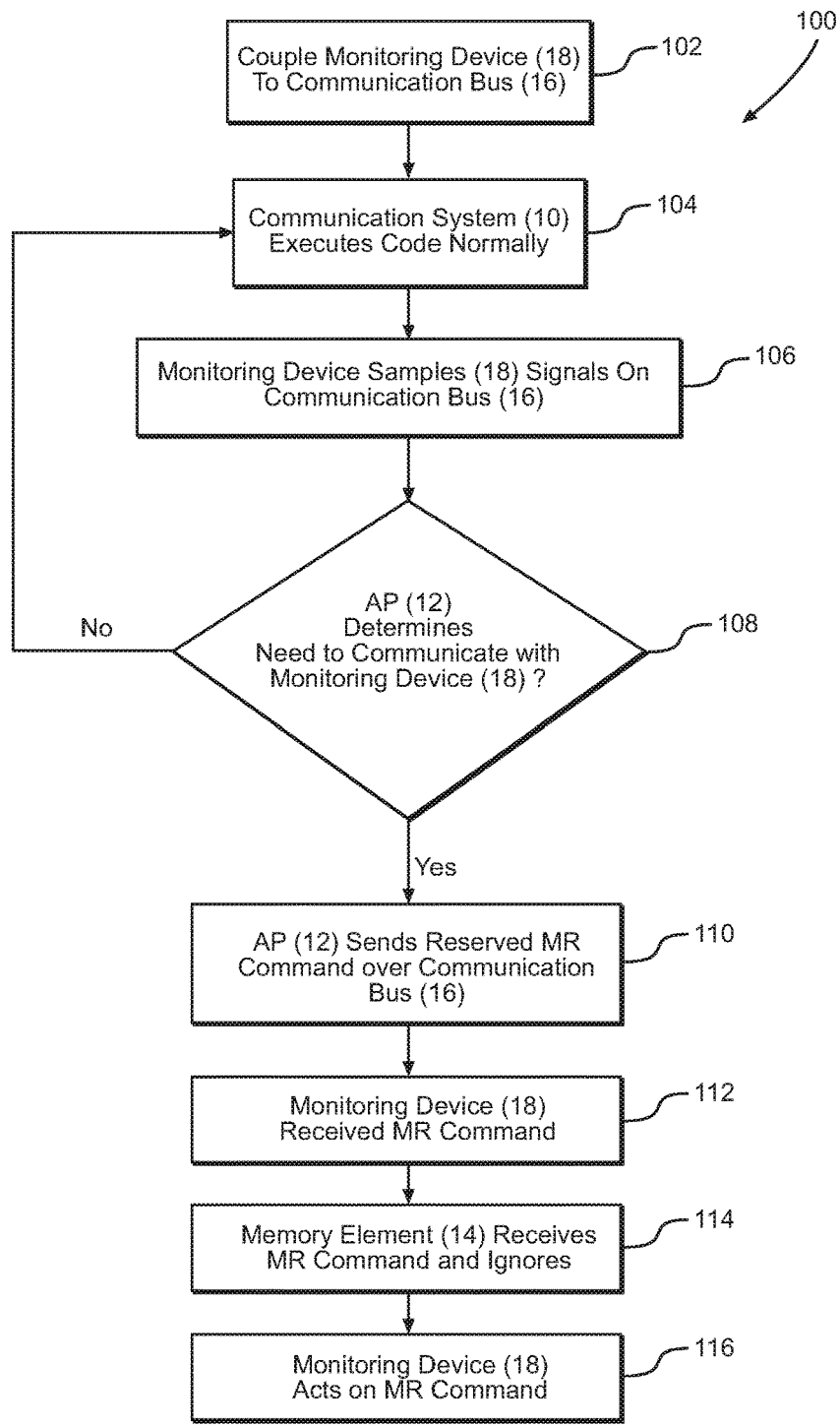
FIG. 7 is a flowchart illustrating the more general concepts of monitoring the communication bus for signals from the host directed to the monitoring device.

While the above discussion has focused on providing pre-warning to the monitoring device 18 of the upcoming signal change on the communication bus 16 through the use of the signal change command, the present disclosure is not so limited. In particular, exemplary aspects of the present disclosure contemplate using a reserved command for any communication to the monitoring device 18. In this regard, FIG. 7 provides a flowchart illustrating process 100 that begins by coupling the monitoring device 18 to the communication bus 16 (block 102). The communication system 10 then executes code normally (block 104). The monitoring device 18 samples signals on the communication bus 16 (block 106).

With continued reference to FIG. 7, the process 100 continues with the application processor 12 determining that there is a need to communicate with the monitoring device 18 (block 108). If the determination is negative, the process 100 returns to the normal code execution of block 104. If, however, the determination is positive at block 108, then the application processor 12 sends out a reserved MR command over the communication bus 16 (block 110). The monitoring device 18 receives the MR command (block 112) and parses the command. Concurrently, the memory element 14 likewise receives the MR command and, having been programmed to ignore the command, ignores the MR command (block 114). The monitoring device 18 in contrast, acts on the MR command appropriately (block 116). Besides upcoming parameters changes, the MR command may instruct the monitoring device 18 to change its mode of a operation, such as timing or state mode of operation, or the like.

Figure 8:
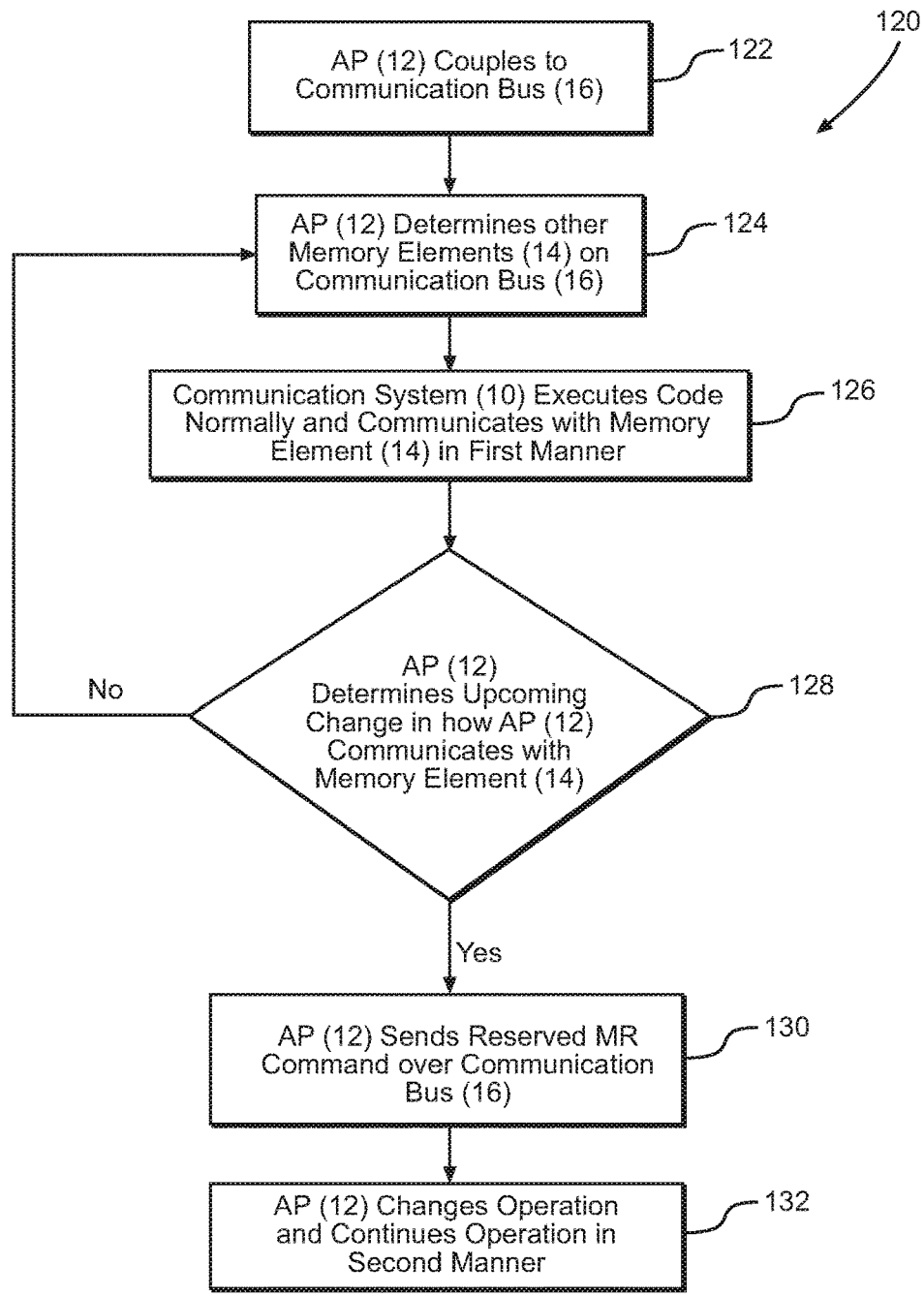
FIG. 8 is a flowchart illustrating exemplary processes of sending signals to the monitoring device over the communication bus from the host.

FIG. 8 provides a flowchart for a similar process 120 from the perspective of the application processor 12. In particular, the process 120 begins with the application processor 12 being coupled to the communication bus 16 (block 122) and determining other memory element(s) on the communication bus 16 (block 124). The communication system 10 executes code normally to communicate with the memory element 14 in a first manner (block 126).

With continued reference to FIG. 8, the application processor 12 determines an upcoming change in how the application processor 12 communicates with the memory element 14 (block 128). In an exemplary aspect, the application processor 12 detects an upcoming parameter change or protocol change. In another exemplary aspect the application processor 12 has other information to pass to the monitoring device 18. In some exemplary aspects, the application processor 12 knows that the monitoring device 18 is coupled to the communication bus 16. In other exemplary aspects, the application processor 12 does not know that the monitoring device 18 is coupled to the communication bus 16. In either event, the application processor 12 sends a reserved MR command over the communication bus 16 (block 130) to inform the monitoring device 18 of the upcoming change. The reserved MR command may be designated for application processor 12 to monitoring device 18 communication as explained above. The application processor 12 then changes operation and continues normal operation in a second manner (block 132). It should be appreciated that the differences between the operation in the first manner and operation in the second manner may be differences in frequency, protocol, timing, or the like.

The systems and methods for pre-warning a monitoring tool for a communication bus according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a smart phone, a tablet, a phablet, a server, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, and an automobile.

Figure 9:
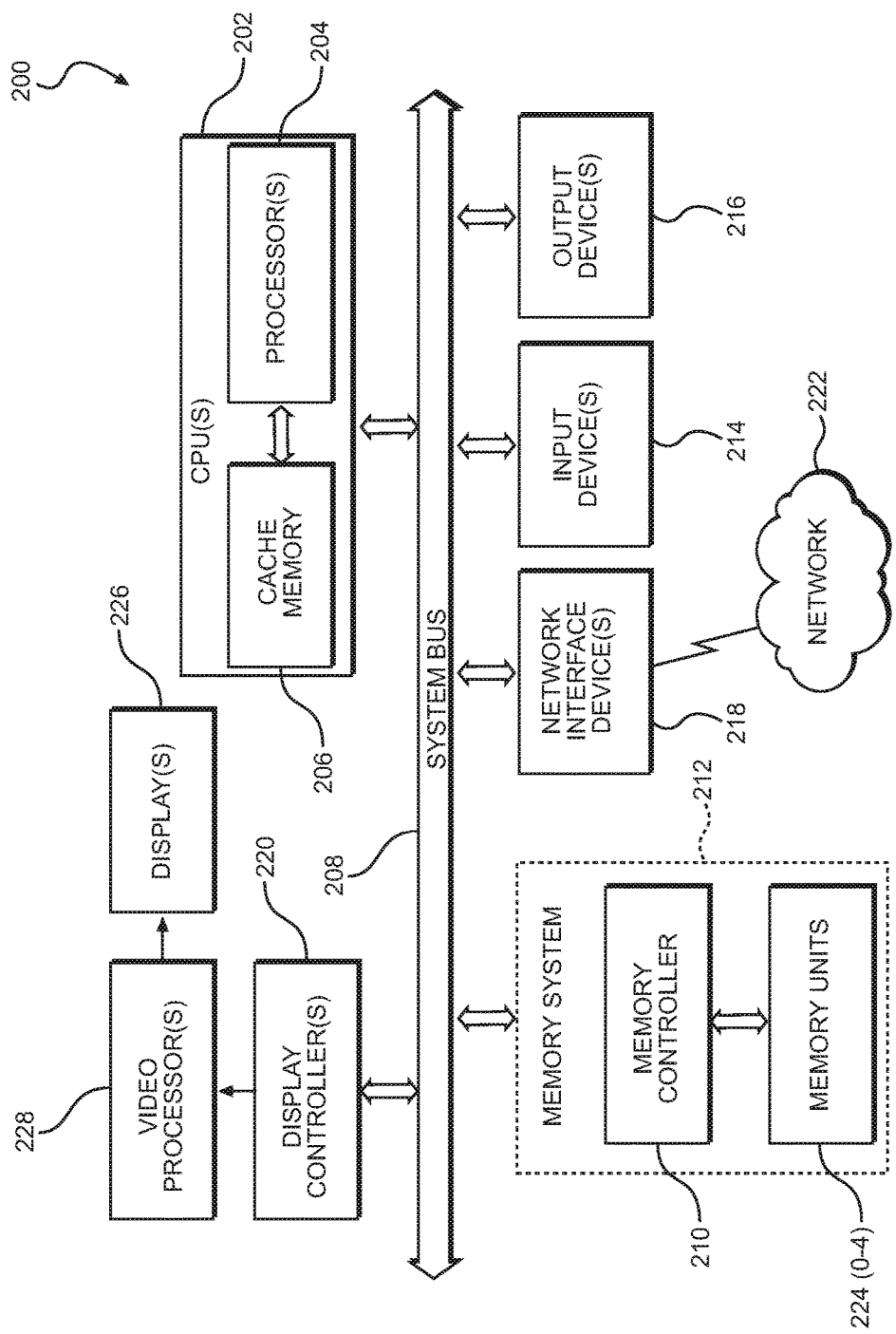
FIG. 9 is a block diagram of an exemplary processor-based system that can include the memory bus of FIG. 1.

In this regard, FIG. 9 illustrates an example of a processor-based system 200 that can employ the communication system 10 illustrated in FIG. 1. In this example, the processor-based system 200 includes one or more central processing units (CPUs) 202, each including one or more processors 204. The CPU(s) 202 may have cache memory 206 coupled to the processor(s) 204 for rapid access to temporarily stored data. The CPU(s) 202 is coupled to a system bus 208 and can intercouple master and slave devices included in the processor-based system 200. As is well known, the CPU(s) 202 communicates with these other devices by exchanging address, control, and data information over the system bus 208. For example, the CPU(s) 202 can communicate bus transaction requests to a memory controller 210 as an example of a slave device.

Other master and slave devices can be connected to the system bus 208. As illustrated in FIG. 9, these devices can include a memory system 212, one or more input devices 214, one or more output devices 216, one or network interface devices 218, and one or more display controllers 220, as examples. The input device(s) 214 can include any type of input device, including, but not limited to, input keys, switches, voice processors, etc. The output device(s) 216 can include any type of output device, including, but not limited to, audio, video, other visual indicators, etc. The network interface device(s) 218 can be any device configured to allow exchange of data to and from a network 222. The network 222 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 218 can be configured to support any type of communications protocol desired. The memory system 212 can include one or more memory units 224(0-N). The bus (not labeled) between the memory controller 210 and the memory units 224(0-N) may be the communication bus 16. Alternatively, the communication bus 16 may be the system bus 208.

The CPU(s) 202 may also be configured to access the display controller(s) 220 over the system bus 208 to control information sent to one or more displays 226. The display controller(s) 220 sends information to the display(s) 226 to be displayed via one or more video processors 228, which process the information to be displayed into a format suitable for the display(s) 226. The display(s) 226 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. An application processor comprising:
a communication bus interface configured to be coupled to a communication bus; and
a control system operatively coupled to the communication bus interface, the control system configured to:
communicate with a memory element through the communication bus in a first manner;
determine an upcoming change in how the application processor communicates with the memory element;
send a reserved command to a monitoring device informing the monitoring device of the upcoming change; and
communicate with the memory element through the communication bus in a second manner.

2. The application processor of claim 1, wherein the control system configured to send the reserved command is configured to send a signal change command over the communication bus.

3. The application processor of claim 1, wherein the control system configured to send the reserved command is configured to send a reserved JEDEC command over the communication bus.

4. The application processor of claim 1, wherein the control system configured to send the reserved command is configured to send a reserved mode register (MR) command indicating a signal change.

5. The application processor of claim 1, wherein the control system configured to send the reserved command is configured to send a signal change command indicating a frequency change.

6. The application processor of claim 1, wherein the control system configured to send the reserved command is configured to send a signal change command indicating a change in a parameter on the communication bus.

7. The application processor of claim 1, wherein the first manner comprises a first set of parameters relating to frequency, voltage, termination, or protocol and the second manner comprises a second set of parameters relating to frequency, voltage, termination, or protocol.

8. The application processor of claim 1 integrated into a device selected from the group consisting of: a set top box; an entertainment unit; a navigation device; a communications device; a fixed location data unit; a mobile location data unit; a mobile phone; a cellular phone; a smart phone; a tablet; a phablet; a server; a computer; a portable computer; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; and an automobile.

9. A method of pre-warning a monitoring device of an upcoming change on a communication bus, the method comprising:
communicating with a memory element through a communication bus in a first manner;
determining an upcoming change in how an application processor communicates with the memory element;
sending a reserved command to a monitoring device informing the monitoring device of the upcoming change; and
communicating with the memory element through the communication bus in a second manner.

10. The method of claim 9, wherein sending the reserved command comprises sending a reserved JEDEC command over the communication bus.

11. The method of claim 9, wherein sending the reserved command comprises sending a reserved mode register (MR) command indicating a signal change.

12. The method of claim 9, wherein sending the reserved command comprises sending a signal change command indicating a frequency change.

13. The method of claim 9, wherein sending the reserved command comprises sending a signal change command indicating a change in a parameter on the communication bus.

14. The method of claim 9, wherein the first manner comprises a first set of parameters relating to frequency, voltage, termination, or protocol, and the second manner comprises a second set of parameters relating to frequency, voltage, termination, or protocol, and a second reference voltage.

15. A method for communicating with a monitoring device that monitors a communication bus, the method comprising:
detecting at an application processor a need to communicate with a monitoring device; and
sending a reserved mode register (MR) command over a communication bus wherein the reserved MR command is designated as being ignored by a memory element associated with the communication bus.

16. The method of claim 15, further comprising communicating from the application processor to the memory element associated with the communication bus in a first manner prior to sending the reserved MR command and in a second manner after sending the reserved MR command.

17. The method of claim 15, wherein detecting the need to communicate with the monitoring device comprises detecting an upcoming change in how the application processor communicates with the memory element.

* * * * *